United States Patent [19]

De Lorenzo et al.

[11] 4,413,647

[45] Nov. 8, 1983

[54] LEAK DETECTION ARRANGEMENT FOR VALVE HAVING SEALING MEANS

[76] Inventors: Bruce L. De Lorenzo; Daniel J. McCarthy, both of P.O. Box 72, Clifton, N.J. 07015

[21] Appl. No.: 55,722

[22] Filed: Jul. 9, 1979

Related U.S. Application Data

[63] Continuation of Ser. No. 309,903, Nov. 27, 1972, abandoned, and Ser. No. 624,199, Oct. 20, 1975, Pat. No. 4,052,997, and Ser. No. 839,096, Oct. 3, 1977, abandoned.

[51] Int. Cl.³ ............................................. F16L 55/07
[52] U.S. Cl. .................................. 137/312; 92/5 R; 92/86; 137/315; 222/334; 417/392; 417/403
[58] Field of Search .................... 137/312, 315; 92/86, 92/5 R, 150, 151; 222/334, 372, 383, 385; 417/398, 402, 403, 392, 399, 401

[56] References Cited

U.S. PATENT DOCUMENTS

| | | | |
|---|---|---|---|
| 1,610,174 | 12/1926 | Smith et al. | 92/86 X |
| 2,000,265 | 5/1935 | Vickers | 92/86 |
| 2,388,662 | 11/1945 | Anderson et al. | 91/355 |
| 2,606,696 | 8/1952 | Miner | 417/403 |
| 3,163,360 | 12/1964 | McNinch, Jr. et al. | 222/334 X |
| 3,255,675 | 6/1966 | Reeve et al. | 92/151 |
| 3,431,953 | 3/1969 | Rutherford | 222/334 X |
| 3,537,619 | 11/1970 | Glesner et al. | 222/334 |
| 3,661,060 | 5/1972 | Bowen | 92/5 R |
| 3,972,396 | 8/1976 | Bochrak | 92/86 |

FOREIGN PATENT DOCUMENTS

| | | | |
|---|---|---|---|
| 683621 | 4/1964 | Canada | 417/403 |
| 1125573 | 11/1956 | France | 92/86 |
| 499276 | 11/1954 | Italy | 417/403 |

*Primary Examiner*—George L. Walton

[57] ABSTRACT

A valve includes a plunger which is movable by actuating means such as a solenoid coil, air pressure or other means to move a valve member toward and away from a valve seat. The fluid flow area of the valve is sealed from the actuating means by the diaphragm, O-rings or other forms of sealing structure. In order to insure against leakage past the diaphragm or seal and especially against leakage into the actuating means, the construction includes another diaphragm or seal spaced from the first seal providing a seal space between the first and second diaphragms or seals. In the event of leakage past the first sealing means, flow of the liquid into the space between the first and second sealing means causes an outward flow of the fluid through a detecting passage which thereby provides means which disclose the leakage past the first sealing means so that the first sealing means can be immediately replaced before any damage to the actuating means or to the system itself.

3 Claims, 7 Drawing Figures

LEAK DETECTION ARRANGEMENT FOR VALVE HAVING SEALING MEANS

This is a continuation of copending parent applications Ser. No. 309,903, filed Nov. 27, 1972, now abandoned, and in turn Ser. No. 624,199, filed Oct. 20, 1975, now U.S. Pat. No. 4,052,997, and Ser. No. 839,096, filed Oct. 3, 1977, now abandoned.

BACKGROUND OF THE INVENTION

This invention relates in general to the construction of valves and, in particular, to a new and useful device for detecting leakage past a diaphragm or seal of a solenoid, air driven or other type valve in order to prevent damage to the actuating means.

DESCRIPTION OF THE PRIOR ART

Prior to the present invention, it was known to provide a valve with a diaphragm which seals in order to prevent any liquid from entering into the actuating area and into the electrical coil for energizing the solenoid. The disadvantage of the construction of such valves is that when the diaphragm begins to wear and leakage develops, such leakage is not detected before damage has been done to the actuator itself. As a consequence, costly replacement of the solenoid was necessary. Also, system failure could occur in addition to valve failure.

SUMMARY OF THE INVENTION

In accordance with the present invention, the valve includes two diaphragms or seals which are located at spaced axial locations in order to seal a space which is connected to the atmosphere through a leak detection passage. With the construction, any leakage past the first diaphragm or seal will move outwardly through the detection passage and be readily visible. This provides a direct indication that the first diaphragm is leaking and that it needs to be replaced. The replacement of the diaphragm is easy and simple and thus considerable damage to the valve and system is avoided.

Accordingly, it is an object of the invention to provide a sealed valve construction which includes a seal space in proximity to the sealing means which is communicated to the exterior so that any leakage past the sealing means is immediately detectable and correctable.

A further object of the invention is to provide a valve construction with leakage detection means and which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

GENERAL DESCRIPTION OF THE INVENTION

Figure 1:
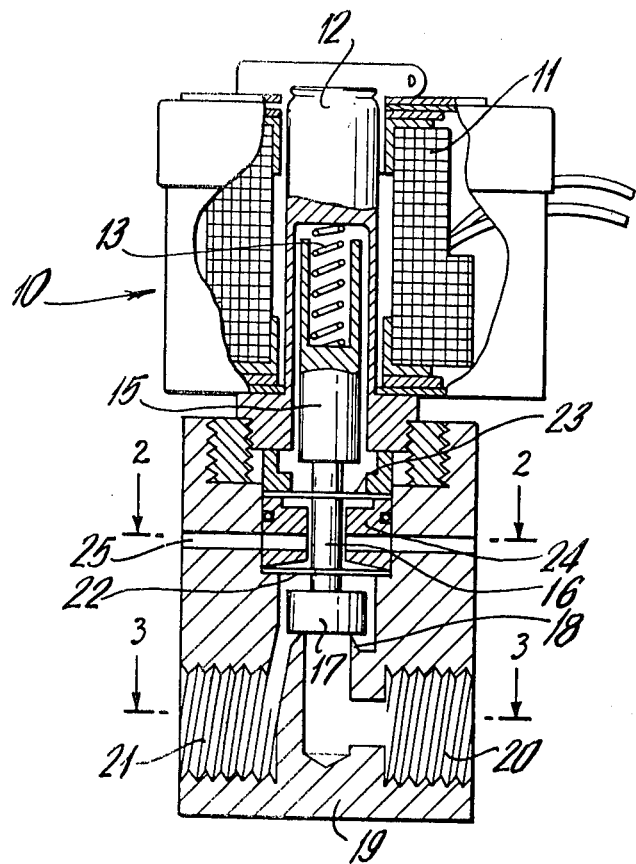
FIG. 1 is a vertical sectional view of a solenoid valve constructed in accordance with the invention.
Figure 2:
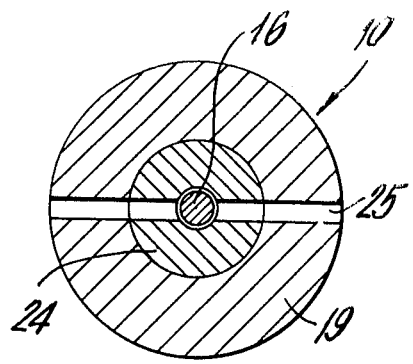
FIG. 2 is a section taken along the line 2—2 of FIG. 1.
Figure 3:
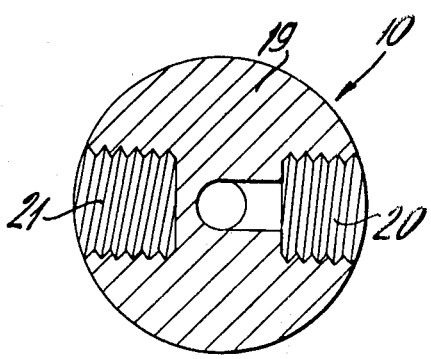
FIG. 3 is a section taken along the line 3—3 of FIG. 1.

Referring to the drawings in the form shown in FIGS. 1-3, there is shown therein an actuating means in the form of a solenoid valve which is generally designated by the numeral 10. The valve includes the usual solenoid coil 11, which is disposed around a solenoid core tube 12. The tube has a spring 13, which is in biased relation between the tube 12 and a solenoid plunger 15. The plunger 15 reciprocates in the core tube 12 carrying with it an extension or piston 16. At the lower end of the piston is a valve member 17. The construction is such that the valve member moves toward and away from a valve seat 18. The seat is located within the valve body 19 and between inlet passage 20 and outlet passage 21. The space in above the inlet passage 20 which surrounds the valve member 17 and communicates with the outlet passage 21, is sealed by a diaphragm 22. The diaphragm peripherally engages the body 19 at its outer circumference and also engages the extension 16 at its inner circumference. Thus, the flow of liquid between the inlet passage 20 and outlet passage 21 is insured at the appropriate times. The diaphragm 22 is utilized to prevent any passage of said liquid to the solenoid, to attempt to prevent damage thereto. However, such diaphragm have heretofore been known to become worn rather frequently, whereby their function is rendered useless and damage has been done to the expensive solenoid without detection of any leakage, whereupon the solenoid must be replaced.

The present invention provides means whereby damage to the solenoid can be prevented as soon as diaphragm 22 begins to wear. The means are such that the wear of the diaphragm 22 can be detected before any damage to the solenoid itself. In the form shown, these means comprise a second sealing diaphragm 23 which is secured between and peripherally engages the valve body 19. The inner circumference of the diaphragm 23 engages the extension 16. As a consequence, a second leakproof area is provided. The diaphragm 23 is disposed in a spaced relation in an axial direction to diaphragm 22. Also located between the diaphragms 23 and 22 is a spacer 24. In accordance with the invention a passage 25 is provided from the interior of the spacer 24 through the valve body 19. As a consequence, it will be noted that if the diaphragm 22 is in any way damaged through wear or otherwise, the liquid flowing from inlet 20 will bypass this diaphragm 22. However, such liquid flow will not damage the solenoid 10 in any way, as flow to the solenoid will be prevented by diaphragm 23. In the meantime, damage to the diaphragm 22 can be detected by the flow of such liquid out through the port or passage 25, which will flow to the exterior of the body 19. Thus, immediate detection of damage to the diaphragm 22 is possible by visual inspection. When the flow is visible at the exterior of the passage 25, it is a sign that the first diaphragm 22 needs replacement and this can be easily and quickly done before any major damage is done to the solenoid by a flow of liquid upwardly into the solenoid core tube 11.

The passage 25 may be connected to any means for transporting the liquid leaking through the passage to a remove location.

Thus, the invention provides an easy and simple manner for detecting leakage of the diaphragm 22 of a solenoid valve 10 so that it can be replaced before any leakage beyond the extension 16 of the solenoid plunger occurs.

Figure 4:
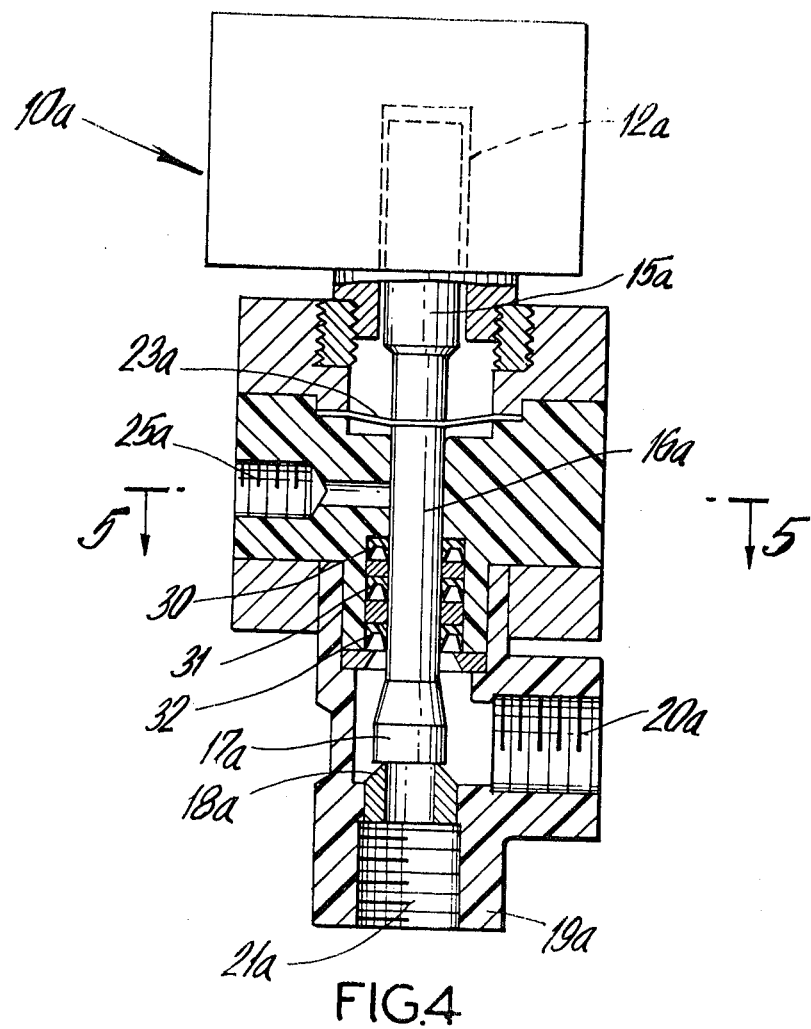
FIG. 4 is a vertical sectional view of a modified form of a solenoid valve constructed in accordance with the invention.
Figure 5:
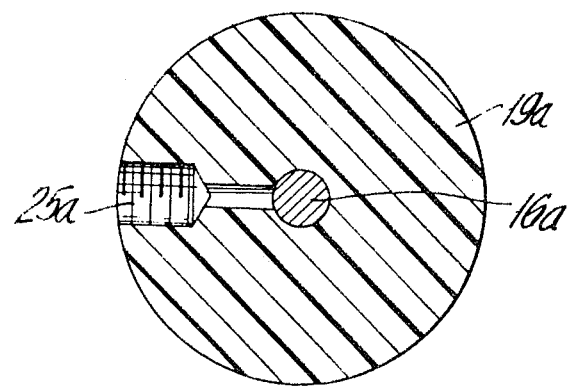
FIG. 5 is a section taken along the line 5—5 of FIG. 4.

FIGS. 4 and 5 show a valve in which the inlet passage 20a and outlet passage 21a are located correspondingly above and below the valve seat 18a. This form is particularly beneficial when high flow rates and high pressures are encountered. In view of the fact that the fluid passes through the inlet above the valve seat 18a the pressure rating is difficult to obtain with a large flat diaphragm and another arrangement as hereinafter described is disclosed.

In this construction a solenoid 10a which has the conventional solenoid coil (not shown) is disposed around solenoid core tube 12a. A plunger 15a reciprocates in the core tube 12a carrying with it an extension or piston 16a. The plunger is preferably made of plastic such as Teflon. A set of seals 30, 31 and 32 are provided through which the plunger 15a passes in order to minimize the area which is affected by the pressure of the flow of liquids through the inlet passage 20a to the outlet passage 21a. The seals 30-32 are disposed above the inlet passage 20a and the valve seat 18a.

In the event the seals become damaged or worn a passage 25a is provided below the solenoid 10a. The passage will carry any liquid passing through the sealed area and the fact that the seals 30-32 are damaged can be readily detectable by visual inspection. According to the present invention, the escaping fluid cannot cause damage to the solenoid or system by reason of the provision of a seal or diaphragm 23a which prevents the passage of the fluid into the solenoid chamber. It is to be noted that despite the pressure in the system, the diaphragm 23a, because of the arrangement, i.e. the substantially continuous slidable relation between the plunger 15a and the axial bore in the valve which surrounds it above and below passage 25a, is never in contact with any fluid under pressure.

Thus, it may be seen that this modified form of the present invention prevents any damage to the actuator even with high flow rates and high pressure in the valve.

Figure 6:
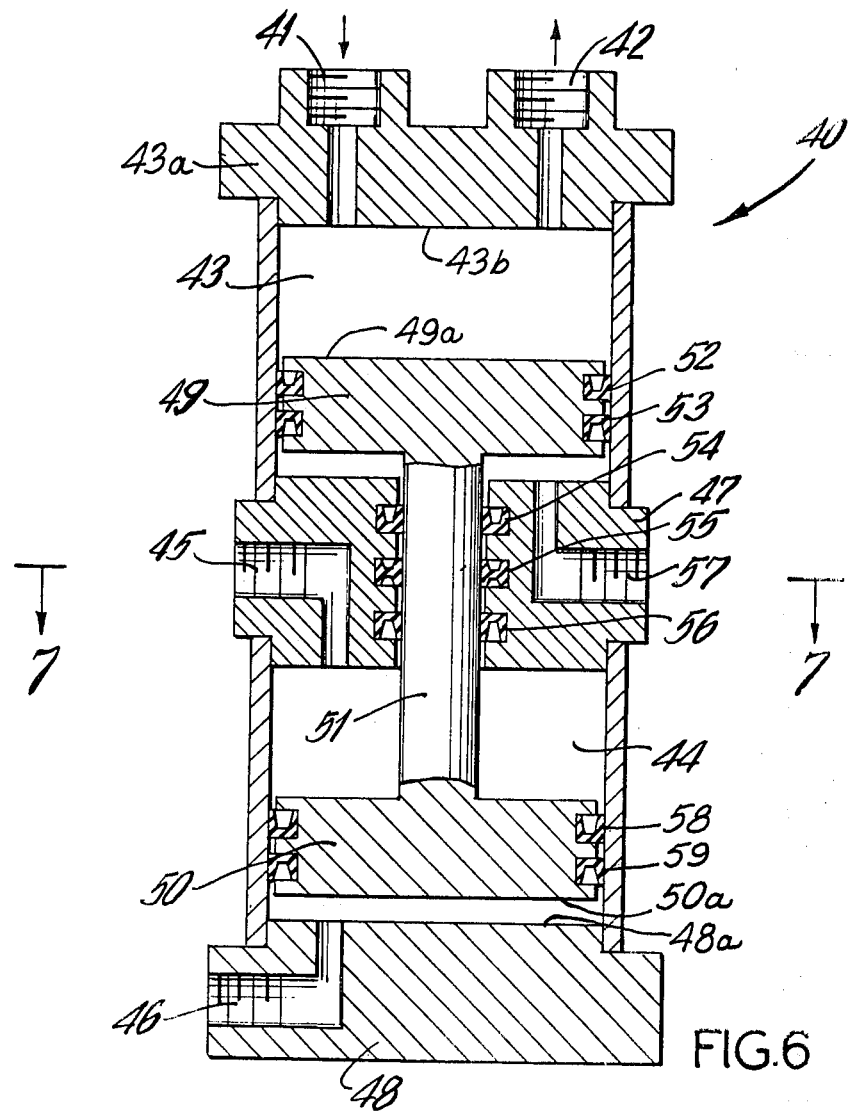
FIG. 6 is a vertical sectional view of still another form of valve, namely, an air pressuring metering valve constructed in accordance with the invention.
Figure 7:
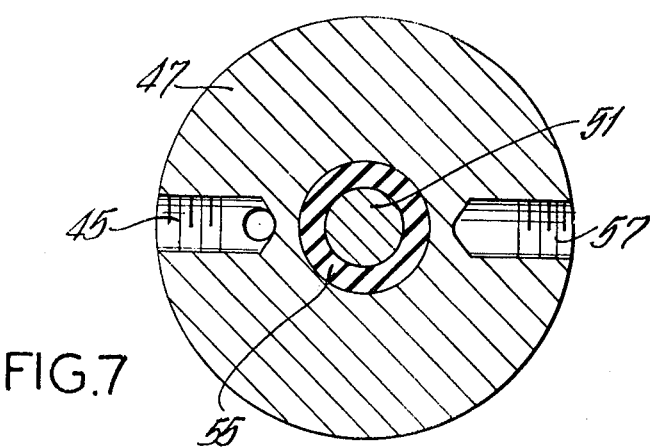
FIG. 7 is a section taken along the lines 7—7 of FIG. 6.

In the form shown in FIGS. 6 and 7 the damage detecting means of the present invention are shown in an air driven metering valve.

As shown the valve 40 is provided with an inlet port 41 and an outlet port 42 for the flow of liquids passing through chamber 43. Air is introduced into air chamber 44 through passages 45 and 46 which act as both the inlet and outlet ports under the conditions hereinafter described. The passages 45 and 46 are located in passage containing valve members 47 and 48 respectively. Reciprocating pistons 49 and 50 are connected to each other by shaft or plunger 51 and are slidably mounted in the valve housing. Being of substantially the same size and conformation, the pistons 49 and 50 serve to counterbalance each other operatively during their common reciprocation, as the artisan will appreciate (cf. FIG. 6).

Seals 52 and 53 surround the piston 49 normally preventing the liquid in chamber 43 from flowing into the actuating chamber 44. A plurality of seals 54, 55 and 56 surround the shaft or plunger 51 located in valve member 47. A detecting passage 57 is located, as shown, in valve member 47.

In operation of the valve, a measured, predetermined amount of liquid flows into chamber 43 through inlet 41. The pistons 49 and 50 are located adjacent their respective valve members 47 and 48 during this time, that is in the liquid filling position shown in FIG. 6. When chamber 43 is filled with the desired amount of liquid, air under pressure is introduced into chamber 44 through inlet 46. This action moves the piston 50 and its interconnected piston 49 in such fashion as to force the liquid out of chamber 43 through outlet 42 to its ultimate destination. During this part of the operation air in the chamber 44 passes outwardly through passage 45.

Thereafter, air under pressure is introduced through passage 45 (which becomes the inlet port) moving the pistons 49 and 50 in the opposite direction whereupon liquids can again flow into chamber 43 through inlet 41. In this part of the operation air in the chamber 44 passes outwardly through passage 46. The above cycle is then sequentially repeated. Thus, chamber 44 serves as a double acting cylinder and piston 50 correspondingly serves as a double acting piston for actuating piston 49.

According to the present invention, in the event of damage or wear to the seals 52 and 53, any liquid bypassing these seals will flow to and through passage 57, located in end wall member 47 and which directly openly flow communicates with the chamber 43 remote from the end wall containing inlet 41 and outlet 42, to the exterior of the valve housing. As a consequence, there is a visual indication of fluid leakage because of damage to the seals. However, the fluid cannot pass into the actuating chamber 44 because of the presence of the seals 54-56. Thus, the seals 52 and 53 can be replaced before the liquid flows into the chamber 44 preserving the integrity of the air chamber.

It will be seen that inlet port 41 and outlet port 42 are situated in the passage containing valve member 43a provided with a valve end wall portion 43b between inlet and outlet ports 41 and 42 in liquid chamber 43, and that piston 49 has an imperforate piston face 49a freely disposed relative to end wall portion 43b and valve member 43a. Also, passage containing valve member 48 has an end wall 48a provided with a centrally imperforate wall portion, and piston 50 has an imperforate piston face 50a freely disposed relative to end wall 48a and valve member 48. Seals 58 and 59 surround piston 50 similarly to the seals 52 and 53 which surround piston 49.

While the invention has been described in detail with reference to specific forms, it will be understood that such description is in no way intended to limit the scope of the invention as set forth in the appended claims.

What is claimed is:

1. Valve construction comprising actuating means and a chambered valve body including
   a first chamber in the valve body having a fluid inlet passage and a fluid discharge passage,
   a valve wall portion between the inlet and discharge passages of the first chamber,
   a first plunger movable toward and away from the valve wall portion of the first chamber,
   an end wall portion for the first chamber on the side of the first plunger remote from the valve wall portion,
   a second chamber having opposed fluid inlet and discharge passages and an end wall remote from the first chamber provided with a centrally imperforate wall portion, a second plunger freely disposed in relation to the end wall provided with the centrally imperforate wall portion and operatively arranged for movement between the opposed passages of the second chamber, first sealing means mounted between the first plunger and the first chamber for preventing the flow of fluid from the first chamber into the second chamber, second sealing means spaced from the first sealing means for preventing the flow of any fluid leaking past the the first sealing means from flowing into the second chamber, and a separate leak detection passage extending from the interior of the first chamber outwardly to the exterior thereof and located in the end wall portion of the first chamber and between the first and second sealing means and directly openly communicating with the first chamber for the flow of any fluid leaking past the first sealing means to a visible location outside of the valve body to indicate that the first sealing means requires replacement.

2. Valve construction according to claim 1 wherein the first and second sealing means are operatively secured between the corresponding plungers and the valve body, wherein the flow of fluid through the opposed passages in the second chamber reciprocally drives the second plunger in one direction and then another, and wherein the second plunger is operatively connected to the first plunger for common reciprocation therewith for driving the first plunger for controlling fluid flow through the valve wall portion from the inlet passage to the discharge passage in the first chamber, the first plunger and second plunger being of substantially the same size and thereby serving to counterbalance each other operatively during their common reciprocation, and the first chamber being substantially above the second chamber.

3. Valve construction according to claim 1 comprising said actuating means and said chambered valve body including a first valve chamber in the form of a cylinder in the valve body having a fluid inlet passage and a fluid discharge passage, a valve wall portion between the inlet and discharge passages of the first valve chamber, a first valve plunger in the form of a piston movable in the first chamber toward and away from the valve wall portion of the first chamber for controlling fluid flow through the valve wall portion from the inlet passage to the discharge passage in the first chamber, an end wall portion for the first valve chamber on the side of the first valve plunger remote from the valve wall portion, a second actuating chamber in the form of a double acting cylinder in the actuating means having opposed actuating fluid inlet and discharge passages and an end wall remote from the first chamber provided with a centrally imperforate wall portion, a second actuating plunger in the form of a double acting piston freely disposed in the second chamber in relation to the end wall provided with the centrally imperforate wall portion and operatively arranged for reciprocal actuating movement in the second chamber in one direction and then in another between the opposed passages of the second chamber and operatively connected to the first plunger for common reciprocation therewith for driving the first plunger for correspondingly controlling fluid flow through the valve wall portion from the inlet passage to the discharge passage in the first chamber, first sealing means in the form of a seal carried by the first plunger and slidably sealingly engaging the first chamber cylinder for preventing the flow of fluid from the first chamber into the second chamber, second sealing means spaced from the first sealing means and operatively secured between the first plunger and the valve body remote from the first chamber for preventing the flow of any fluid leaking past the first sealing means from flowing into the second chamber, third sealing means in the form of a seal carried by the second plunger and slidably sealingly engaging the second chamber cylinder for preventing the flow of actuating fluid from one side of said second plunger to the other, and a separate leak detection passage extending from the interior of the valve body outwardly to the exterior thereof and located in the end wall portion of the first chamber and operatively between the first and second sealing means in any position of movement of the first sealing means and directly openly communicating with the first chamber remote from the valve wall portion thereof for the flow of any fluid leaking past the first sealing means to a visible location outside of the valve body, the first plunger and second plunger being of substantially the same size and thereby serving to counterbalance each other operatively during their common reciprocation.

* * * * *